Dec. 25, 1928.  
M. TRESCHOW  
1,696,740  
GEARING  
Filed Jan. 24, 1927

Inventor  
Michael Treschow  
By his Attorneys

Patented Dec. 25, 1928.

1,696,740

UNITED STATES PATENT OFFICE.

MICHAEL TRESCHOW, OF COPENHAGEN, DENMARK, ASSIGNOR TO F. L. SMIDTH & CO., OF NEW YORK, N. Y., A CORPORATION OF NEW JERSEY.

GEARING.

Application filed January 24, 1927, Serial No. 163,009, and in Denmark June 17, 1926.

This invention relates to gearing in which two intermediate shafts, parallel with the axes of the aligned driving shaft and driven shaft, are arranged in diametrically opposite relation with respect to the common axis of the driving shaft and the driven shaft, all of such shafts being provided with suitable coacting gear wheels. Such gearing has the possibility of advantage in the distribution of the tooth pressure required for the transmission of power between the two intermediate shafts so that it is possible to reduce the width of the coacting gear wheels and to avoid pressure in the bearings of the driving shaft and the driven shaft so that such shafts will be subjected only to torsional strains. In order, however, that such advantages may be realized, great accuracy is necessary in the formation of the gear teeth, in the mounting of the gear wheels on the shafts, and in the mounting of the shafts in relation to each other, the lack of accuracy resulting in an uneven distribution of power between the two intermediate shafts by reason of inherent elasticity in the system. This difficulty can be overcome in some degree by using shafts of such stiffness that they will not yield to torsional strains or bending stress, but this involves expense and is not always practicable.

In accordance with the present invention the problem is solved more easily by the provision, at some convenient point in the system of gearing, of a floating transmission wheel, usually a toothed gear of otherwise ordinary form, that is, a gear which is capable of displacement in a direction substantially at a right angle to the plane of the center lines of the intermediate shafts so that it will be capable of adjusting itself in such position that it will be subject always to the same operative engagement with the two gears in mesh with it. Regardless of inaccuracy in the shape of the coacting gear wheels and in their relation to each other, there will be assured in this manner an even and uniform transmission of power through the two intermediate shafts. The forces on the floating gear which originate in the tooth pressures on both sides thereof together constitute a couple of forces and, if the weight of the floating gear be disregarded or overcome, such pressures must be equal. If for any reason a greater tooth pressure should be exerted on the floating gear by one of the intermediate shafts than by the other, the floating gear will be displaced with reference to the plane of the axes of the two intermediate shafts until the two tooth pressures become equal. The driven shaft is therefore subject only to a torsional stress. It will be evident, as this description proceeds, that such floating gear may be located at different points in the system of gearing and may be operatively related to the coacting gears and to one or the other of the driving and driven or main shafts in various ways.

A convenient and practical embodiment of the invention is illustrated in Figures 1 and 2 of the drawings, in which.

Figure 1:
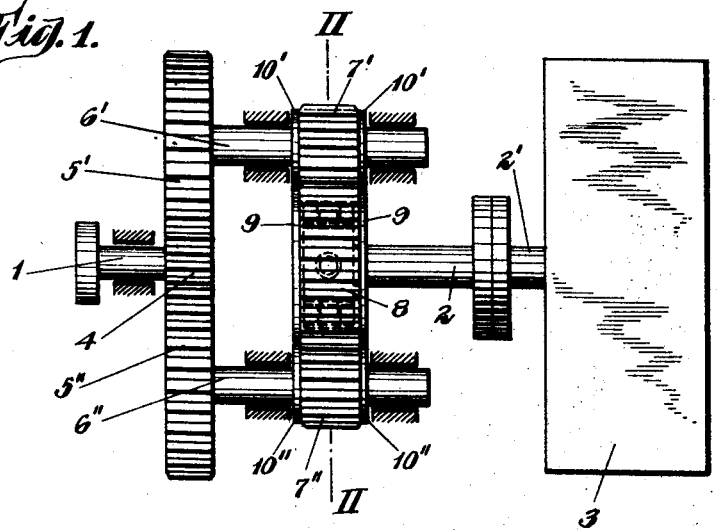
Figure 1 is a somewhat schematic view, as seen from above, of a system of gearing in which the two intermediate shafts are disposed in a horizontal plane, which also includes the common axis of the driving shaft and the driven shaft.
Figure 2:
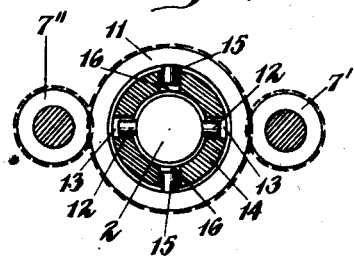
Figure 2 is a view in section on the plane indicated by the line II—II of Figure 1.

In the embodiment of the invention which has been chosen, by way of example, for illustration in Figures 1 and 2, the two main shafts mounted in fixed bearings, that is, the driving shaft 1, deriving power from any suitable source, and the driven shaft 2, coupled through a suitable coupling with the shaft 2' of the machine 3 to be driven, are aligned and the driving shaft 1 carries a pinion 4 in mesh with gear wheels 5' and 5'' which are mounted respectively on intermediate shafts 6' and 6''. These two intermediate shafts are mounted in suitable bearings on opposite sides of the driven shaft 2, in diametrically opposite relation and in the same horizontal plane which includes the common axis of the driving shaft and the driven shaft. The intermediate shafts carry respectively gears 7' and 7'' which mesh with the interposed floating gear 8, loosely mounted on and connected with its supporting shaft. The floating gear 8 is preferably formed with smooth cylindrical bearing rings or surfaces 9 for cooperation with corresponding bearing rings or surfaces 10' and 10'' on the gears 7' and 7'' respectively so that the toothed floating gear 8 is kept always at equal distances from the axes of the two shafts 6' and 6". In this embodiment of the invention the floating gear 8 is coupled directly but loosely to the driving shaft 2 and as a convenient means for effecting such coupling or operative engagement the hub of the shaft 2 is shown as provided with radial studs 12 which enter loosely corresponding holes 13 in an annulus 14, which fits loosely about the hub of the shaft 2, and the floating gear 8, which in this instance is formed as an annulus, and fits loosely about the annulus 14, is shown as provided with inwardly projecting radial studs 15 which enter loosely radial holes 16 formed in the annulus 14. The driven shaft 2 is thus compelled to rotate with the floating gear 8, while the latter is free to be displaced in a vertical plane, either upward or downward with respect to the horizontal plane of the two intermediate shafts 6' and 6". Through such displacement of the floating gear, for any reason whatsoever, as by inaccuracies in the form of the coacting gears or in their relative positions, the floating gear can always adjust itself in such position in relation to the axis of the driven shaft so that it will be subject always to the same tooth pressures from the two coacting gears 7' and 7".

Figure 3:
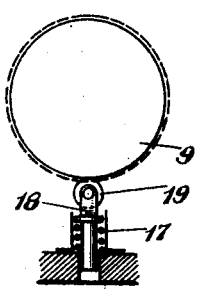
Figure 3 is a detail view in sectional elevation illustrating a means for counteracting the weight of the floating gear.

Should the weight of the floating gear be such as to create an objectionable inequality of tooth pressure in relation to the two coacting gears 7' and 7", such weight may be counteracted without preventing the free movement of the gear by any convenient means, such as that indicated, for example, in Figure 3, in which, in the plane of each bearing ring 9 and beneath the same, a spring 17, acting through a rod 18, supports yieldingly, in contact with the bearing ring 9, a supporting roller 19.

It will be obvious that various changes in details of construction and arrangement can be made to suit different conditions of use and that, except as indicated in the accompanying claims, the invention is not limited to the particular construction and arrangement shown and described herein.

I claim as my invention:

1. A system of gearing comprising a main driving shaft and gear mounted in fixed bearings, two intermediate shafts on opposite sides of the axis of the driving shaft and having gears for engagement with the gear on the driving shaft and having also each a transmitting gear, and a main driven shaft also mounted in fixed bearings, and in which is included a floating gear loosely mounted on and connected with one of said main shafts to rotate therewith but to be displaceable in a direction substantially at a right angle to the plane of its supporting shaft.

2. A system of gearing as described in claim 1, and in which the floating gear is formed as an annulus and a second annulus is loosely interposed between the driven shaft and the floating gear and is loosely engaged with each to permit displacement of the floating gear.

3. A system of gearing as described in claim 1, and in which a means is provided to support resiliently the floating gear to counteract the effect of its inherent weight while permitting displacement thereof in a vertical direction.

This specification signed this 14th day of January, A. D. 1927.

MICHAEL TRESCHOW.